United States Patent
Su et al.

(10) Patent No.: US 7,519,778 B2
(45) Date of Patent: Apr. 14, 2009

(54) SYSTEM AND METHOD FOR CACHE COHERENCE

(75) Inventors: Hong-Men Su, Sindian (TW);
Yung-Chung Liu, Sindian (TW);
Chih-Yung Chiu, Jhubei (TW);
Chung-Hui Chen, Jhudong Township, Hsinchu County (TW)

(73) Assignee: Faraday Technology Corp., Hsinchu (TW)

( * ) Notice: Subject to any disclaimer, the term of this patent is extended or adjusted under 35 U.S.C. 154(b) by 260 days.

(21) Appl. No.: 11/161,616

(22) Filed: Aug. 10, 2005

(65) Prior Publication Data

US 2007/0038813 A1 Feb. 15, 2007

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................................................. 711/141
(58) Field of Classification Search .................. 711/141
See application file for complete search history.

(56) References Cited

U.S. PATENT DOCUMENTS

| | | | | |
|---|---|---|---|---|
| 5,062,081 A * | 10/1991 | Runaldue | ............... | 365/230.05 |
| 5,283,870 A * | 2/1994 | Joyce et al. | .................. | 711/152 |
| 5,974,508 A * | 10/1999 | Maheshwari | ................ | 711/133 |
| 6,088,740 A * | 7/2000 | Ghaffari et al. | ................ | 710/5 |
| 6,122,714 A | 9/2000 | VanDoren et al. | ............ | 711/150 |
| 6,415,340 B1 * | 7/2002 | Ryan et al. | ..................... | 710/52 |
| 6,526,462 B1 * | 2/2003 | Elabd | ......................... | 710/242 |
| 6,633,960 B1 | 10/2003 | Kessler et al. | ............... | 711/144 |
| 6,675,272 B2 * | 1/2004 | Ware et al. | ................... | 711/167 |
| 2001/0007114 A1 * | 7/2001 | Iizuka | ........................ | 710/100 |

OTHER PUBLICATIONS

Jim Handy; "the Cache Memory Book: The authorative reference on cache design"; Academic Press; Second Edition; 1998, pp. 22, 30, 46-47, 80, 137, 156-157.*
Jim Handy, "The Cache Memory Book: The Authoriative Reference On Cache Design", Second Edition, Academic Press, 1998, pp. 20-21.*
David A. Patterson, John L. Hennessy, "Computer Organization And Design: The Hardware/Software Interface", Third Edition, 2005, p. 475.*

* cited by examiner

*Primary Examiner*—Matt Kim
*Assistant Examiner*—Christopher D Birkhimer
(74) *Attorney, Agent, or Firm*—Jianq Chyun IP Office (57) ABSTRACT

A system and a method for cache coherence are provided. The system includes a memory apparatus, a detector, a plurality of access-consumers and a plurality of pass-gates. At least one of the access-consumers is a processor having a cache. When the processor replaces the first data in cache with the second data read from the memory apparatus, the process issues the read second data request first, followed by the write-back first data request. The detector provides a detecting signal when the processor issues the read second data request and cancels the provided detecting signal when the processor issues the write-back first data request. Each pass-gate decides whether to pass the third access request outputting from each corresponding access-consumer and transmit it to the memory apparatus according to the detecting signal respectively.

16 Claims, 7 Drawing Sheets

SYSTEM AND METHOD FOR CACHE COHERENCE

BACKGROUND OF THE INVENTION

1. Field of the Invention

The present invention relates to a system having a cache, and more particularly, the present invention relates to a system and a method for cache coherence.

2. Description of the Related Art

In a system with a plurality of access-consumers (processor and peripherals) accessing the same memory, a cache is normally configured in the processor to improve the performance of the system. However, in the case of sharing the memory, it becomes an important subject as how to maintain the coherence of the data in the cache and in the memory.

A directory-based cache coherence system is generally used in the non-broadcasting multiprocessor system. The bit vectors based directory has the capacity in proportion with the size of the entire main memory. The directory is generally static random access memory (SRAM). When the capacity of the main memory increases, the extra cost of the memory to store the directory will become incredibly high. Another optional scheme is using copy tag in each processor cache. However, since the corresponding processor cache tag is temporarily different from the directory tag, when simply using the copy tag, the dirty miss write-back request will be issued first before the miss write-back request is then issued. As a result, the performance of the system will be impaired when dirty miss write-back happens.

SUMMARY OF THE INVENTION

The present invention is to provide a system and a method for cache coherence to allow the processor issues a data miss cache request followed by a data write-back request when the data to be replaced in the processor cache has been modified.

The present invention provides a cache coherence system which includes a memory apparatus, a plurality of access-consumers, a detector and a plurality of pass-gates. The memory apparatus provides data access function according to the request. At least one of the access-consumers is a processor having a cache, wherein cache stores part of the data in the memory apparatus. When the processor replaces the first data in cache with the second data read from the memory apparatus, the processor issues the read second data request first followed by the write-back first data request. The detector is coupled to the processor so that the detector provides a detecting signal when the processor issues the read second data request, and cancels the provided detecting signal when the processor issues the write-back first data request. Each pass-gate is coupled between the corresponding access-consumer and the memory apparatus to decide whether pass the third access request outputting from the corresponding access-consumer and transmit it to the memory apparatus according to the detecting signal.

The cache coherence system according to the exemplary embodiments of the present invention, wherein the addresses of the first data and the second data in the memory apparatus have the same first address characteristic. The detector registers and provides the first address characteristic as a detecting signal when the processor issues the read second data request, and erases the registered first address characteristic and cancels the provided detecting signal when the processor issues the write-back first data request. According to the embodiments of the present invention, each pass-gate described herein receives a third access request outputting from the corresponding access-consumer to access the third address and the first address characteristic provided by the detector, and compares the third address characteristic of the third address and the first address characteristic. If the third address characteristic and the first address characteristic are identical, then pause to transmit the third access request through the pass-gate; and if the third address characteristic and the first address characteristic are different, then transmit the third access request through the pass-gate.

The cache coherence system according to the exemplary embodiments of the present invention, wherein the detector provides a pause signal as the detecting signal when the processor issues the read second data request, and the detector cancels the provided pause signal when the processor issues the write-back first data request. According to the embodiments of the present invention, wherein each pass-gate receives the third access request outputting from the corresponding access-consumer to access the third address and the pause signal provided by the detector. If the pass-gate obtains the pause signal, it pauses passing the third access request for transmission; and if the pass-gate doesn't obtain the pause signal, then it passes the third access request and transmits it.

The present invention provides another cache coherence system which is applicable to the system with a memory apparatus and a plurality of access-consumers. Wherein, at least one of the access-consumers is a processor having a cache. Cache is used to store part of the data in the memory apparatus. The method includes the following steps. When the processor replaces the first data in cache with the second data read from the memory apparatus, the processor issues the read second data request first, followed by the write-back first data request. The processor continues to provide a detecting signal when the processor issues the read second data request. The processor cancels the provided detecting signal when the processor issues the write-back first data request. Whether to transmit the third access request outputting from each access-consumer to the memory apparatus is according to the detecting signal.

The present invention provides a detecting signal (i.e. the address characteristic formed by part of the bits of the address to be accessed or a pause signal) when it issues a data miss cache request before it replaces the data in the processor cache which has been modified, then each pass-gate decides whether to pause transmitting the data access request outputting from the access-consumer according to the detecting signal until the data write-back request is issued, then stops providing the detecting signal. Therefore, the present invention allows the processor to issue a data miss cache request first followed by a data write-back request, so that the waiting time of miss cache can be shortened.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Figure 1:
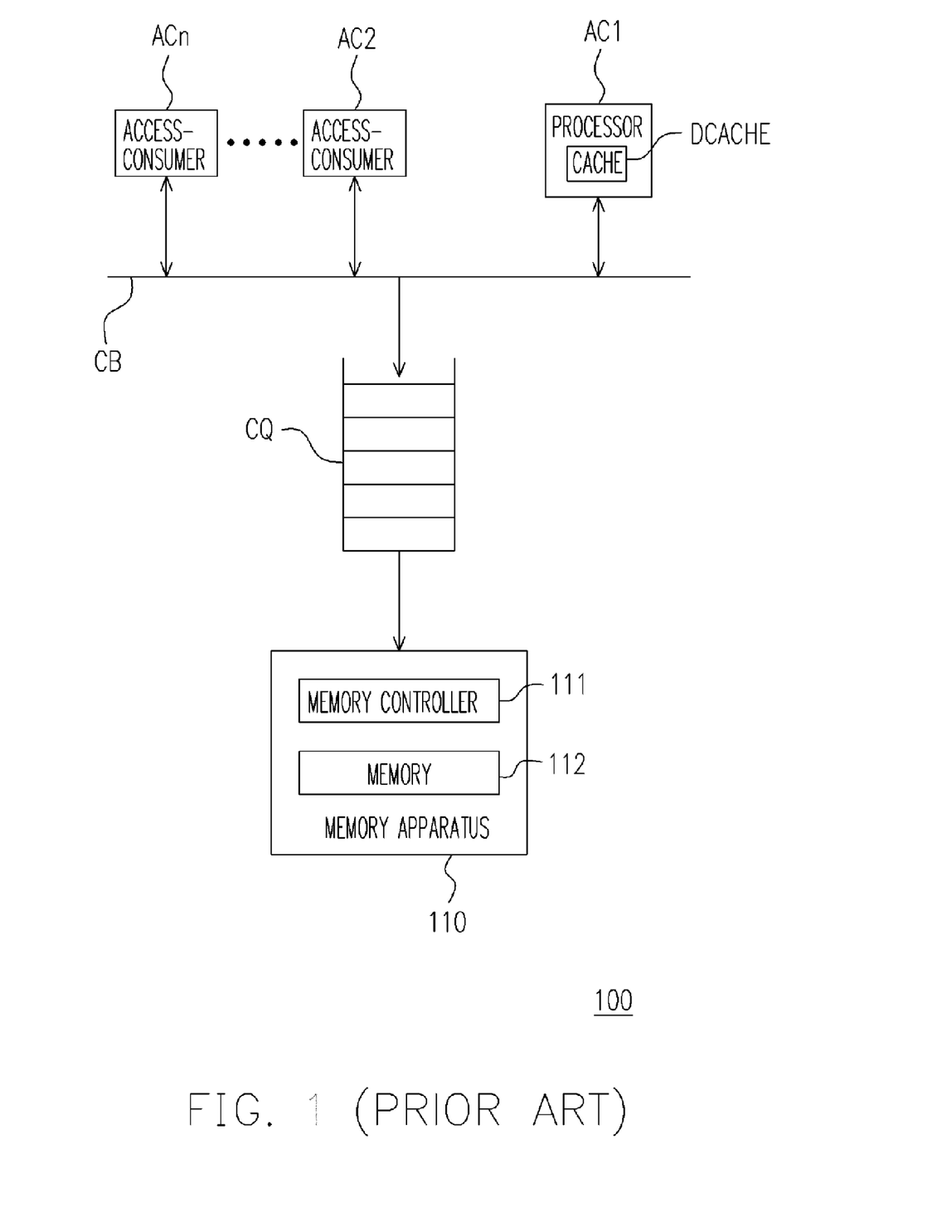
FIG. 1 is a block diagram of a conventional non-broadcasting multiprocessor system without cache coherence.

FIG. 1 is a block diagram of a conventional non-broadcasting multiprocessor system 100 without cache coherence. Referring to FIG. 1, a plurality of access-consumers AC1~ACn transmits the data access request to the memory apparatus 110 through command bus CB and command queue register CQ while the memory apparatus 110 transmits the data back to the access-consumer from which the request was issued through the data bus (not shown). Among access-consumers AC1~ACn, access-consumer AC1 is a processor (i.e. Central Processing Unit or Digital Signal Processor) having a cache DCACHE while the other access-consumers AC2~ACn may be processors or peripherals. In general, the memory apparatus 110 includes the memory controller 111 and the memory 112.

In system 100, if the following access requests happen sequentially:

1. When the processor AC1 writes data A2 into address A of the memory apparatus 110 but data of address A doesn't exist in cache DCACHE, namely, miss data of address A, the processor AC1 issues an "address A miss write request" to the memory apparatus 110.

2. Access-consumer AC2 issues a request to read data from address A of the memory apparatus 110.

Since the access-consumer AC2 issues the read address A request after the processor AC1 writes data A2 into address A, normally, access-consumer AC2 will read the new data A2 modified by processor AC1.

However, after the processor AC1 issues an "address A miss write request" to the memory apparatus 110, it stores the original data Al transmitted back from the memory apparatus 110 into cache DCACHE, then processor AC1 modifies the original address A data A1 in cache DCACHE into new data A2, so that address A of the memory apparatus 110 still stores the original data A1. Here, before processor AC1 writes back the new data A2 into the memory apparatus 110, access-consumer AC2 issues a read address A request; therefore access-consumer AC2 will mistakenly read the original data A1, not the modified new data A2.

In a separate scenario, to improve the performance of the system, when processor AC1 replaces the address A data A1 of the cache with the address B data read from the memory apparatus 110, address A and address B have the same tag (i.e. the same address characteristic) in cache DCHACHE. Processor AC1 is designed to issue the read address B data request first before issuing the write-back address A data request to cut the waiting time of transmitting back address B data. However, this design will cause cache coherence problem. For example, if the following access requests happen in system 100 sequentially.

1. Processor AC1 issues an "address A write back request" to the memory apparatus 110 to rewrite the new data A1 into cache DCACHE.

2. When processor AC1 is to replace address A data in the cache with address B data read from the memory apparatus 110, processor AC1 issues a read data B1 of address B request first, followed by a write-back data A1 of address A request.

3. After processor AC1 issues the read address B data request and before it issues the write-back address A data request, one of the access-consumers (i.e. access-consumer AC2) happens to issue a write address A request to the memory apparatus 110 to write new data A2 into address A of the memory apparatus 110.

Since processor AC1 will issue a read address B data request first followed by a write-back address A data request, data A1 written back into the memory apparatus 110 by processor AC1 will overwrite the new data A2 written by access-consumer AC2. In other words, the new data A2 written by access-consumer AC2 will be lost. Therefore, system 100 has to support cache coherence.

Figure 2:
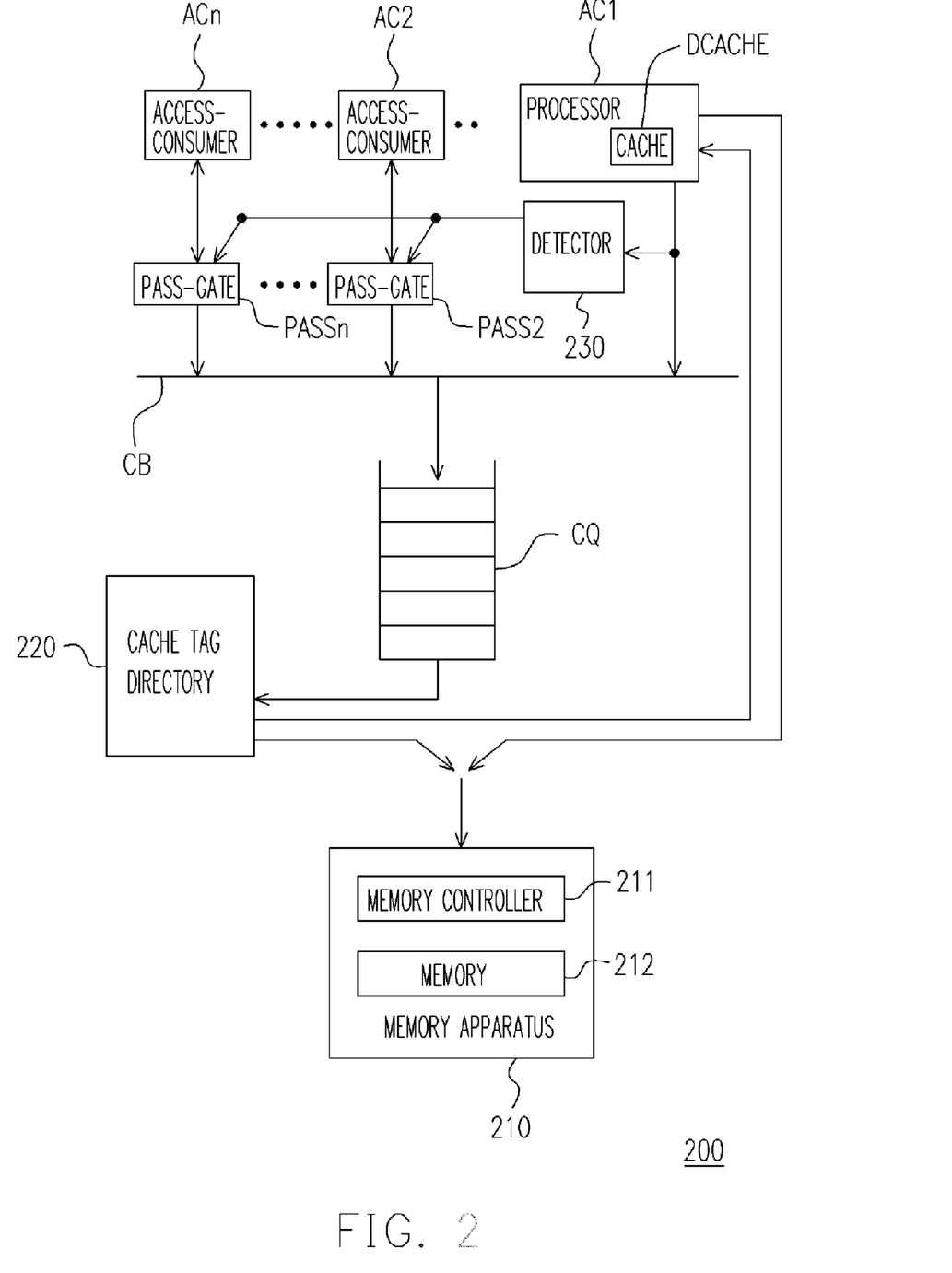
FIG. 2 is a cache coherence system according to an embodiment of the present invention.

FIG. 2 is a cache coherence system according to an embodiment of the present invention. Referring to FIG.2, in system 200, access-consumers AC1~ACn transmit data access request to the memory apparatus 210 through passgates PASS2~PASSn, the command bus CB, the command queue register CQ and the cache tag directory 220. The memory apparatus 210 transmits the data back to the access-consumer from which the request was issued through data bus (not shown).

Among access-consumers AC1~ACn, access-consumer AC1 is a processor (i.e. Central Processing Unit or Digital Signal Processor) having cache DCACHE while the other access-consumers AC2~ACn may be other processors or peripherals. The memory apparatus 210 includes a memory controller 211 and a memory 212.

When system 200 issues the following access request sequentially.

1. Processor AC1 issues an address A miss write request to memory apparatus 210.

2. Access-consumer AC2 issues a request to read data from address A of memory apparatus 210.

When processor AC1 issues address A miss write request to the memory apparatus 210, this request will reach the cache tag directory 220 through the command bus CB and the command queue register CQ. Here, the cache tag directory 220 will record the "address A data is stored in cache DCACHE" into the cache tag directory 220 besides transmitting the address A miss write request issued by processor AC1 to the memory apparatus 210. Accordingly, the content of the cache tag directory 220, for example, is identical with the content of tag memory in cache DCACHE. Or, the content of the cache tag directory 220 can be memory-mapped to the memory apparatus 210.

The memory apparatus 210 transmits the data A1 of address A back to processor AC1 according to the request, and data A1 is stored in cache DCACHE. Then, processor AC1 modifies the original data A1 of address A into new data A2 in cache DCACHE.

Here, the original data A1 is still stored in address A of the memory apparatus 210. Before the new data A2 is written back into the memory apparatus 210 by processor AC1, if access-consumer AC2 issues a read address A request, this request will also reach the cache tag directory 220 through the command bus CB and the command queue register CQ. Here, the cache tag directory 220 will search from the record to find out whether the data to be read by access-consumer AC2 exists in cache DCACHE. In the present embodiment, the recorded address A data in the cache tag directory 220 is stored in cache DCACHE, therefore the cache tag directory 220 transmits the read address A request issued by access-consumer AC2 to the memory apparatus 210 after it issues a signal to invalidate the target data in cache DCACHE (here it is address A data).

In the procedure of invalidating address A data in cache DCACHE described above, if address A data in cache DCACHE has been modified (generally referred to as "dirty"), then address A data is invalidated after new data A2 is written back to address A of the memory apparatus 210. Then, the memory apparatus transmits data A2 back to access-consumer AC2 according to the read address A request issued by access-consumer AC2. Therefore, the cache coherence problem of system 100 in FIG. 1 is avoided.

In addition, consider another cache coherence problem of system 100 in FIG. 1, for example, if in system 200 the following access requests are issued sequentially.

1. Processor AC1 issues an address A miss write request to the memory apparatus 210 to modify data A0 of address A in cache DCACHE to new data A1 after data A0 of address A in the memory apparatus 210 is copied to cache DCACHE.

2. When processor AC1 replaces address A data in the cache with data B1 of address B read from the memory apparatus 210, processor AC1 issues the request to read data B1 from address B first, followed by the request to write-back data A1 into address A.

3. After the processor AC1 issues the read address B data request and before it issues the write-back address A data request, a access-consumer (i.e. access-consumer AC2) happens to issue the write address A request to the memory apparatus 210 to write new data A2 into address A of the memory apparatus 210.

Figure 3A:
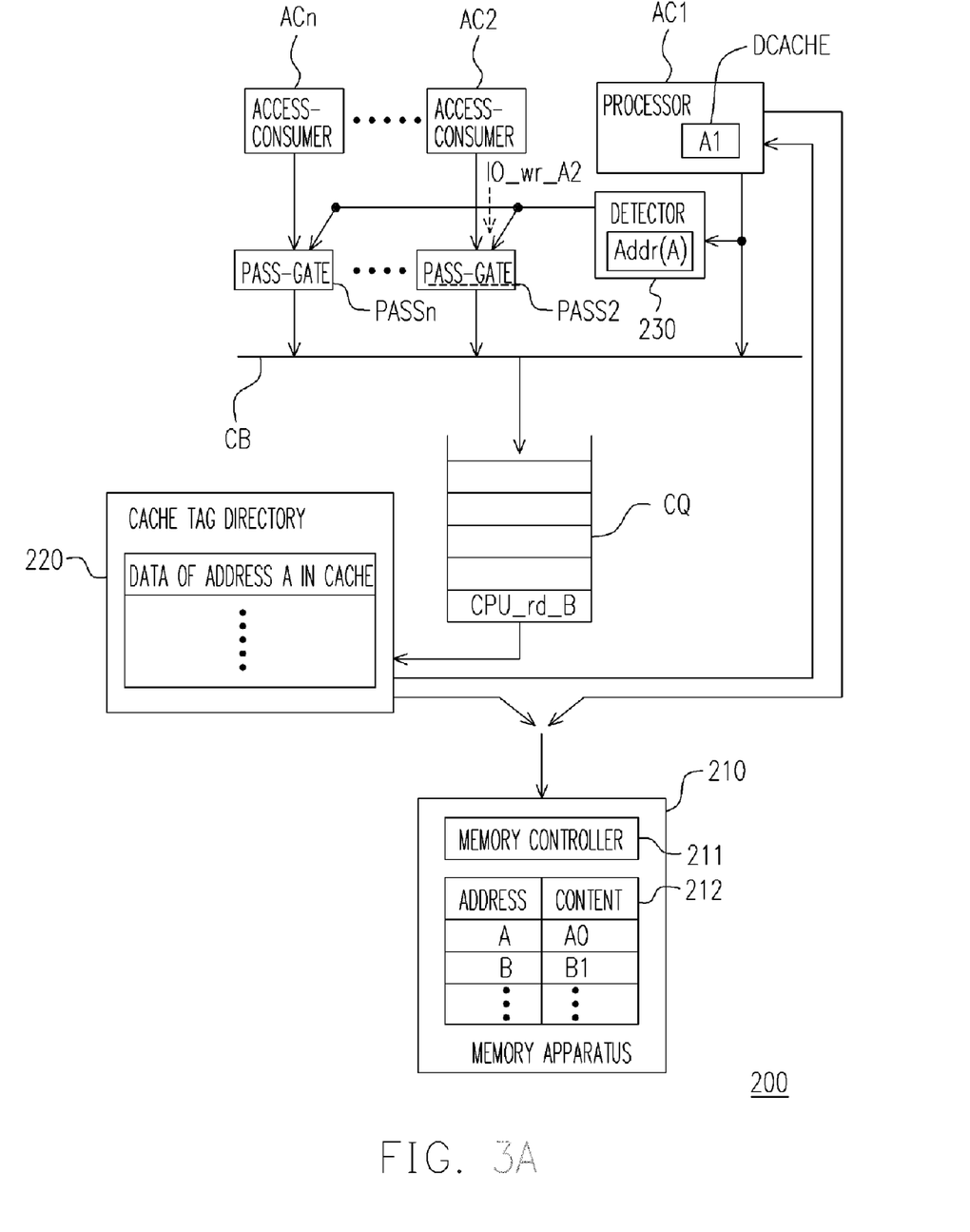
FIGS. 3A through 3C re-draw and illustrate the procedure of the system in FIG. 2 issuing access requests sequentially.
Figure 3B:
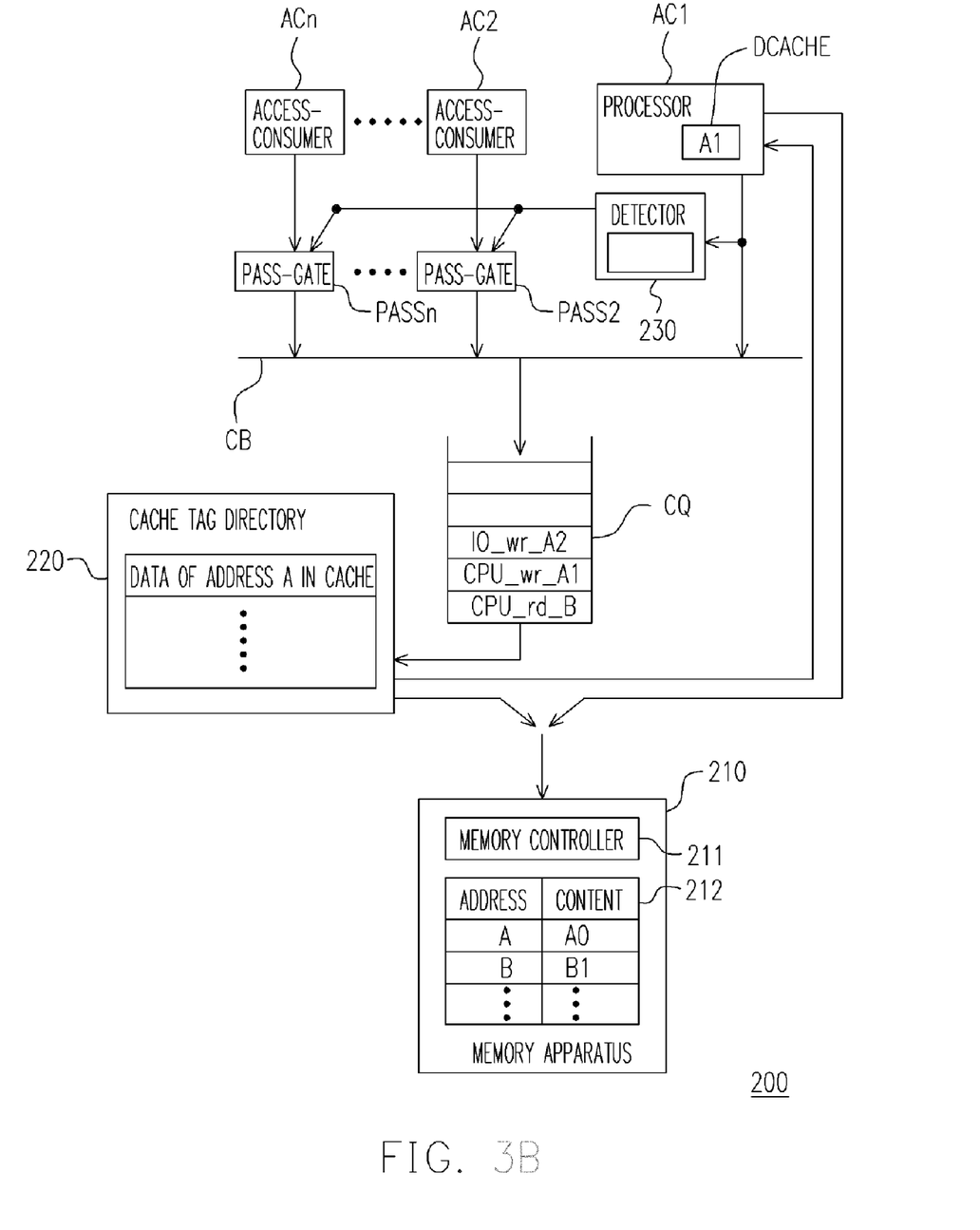
Figure 3C:
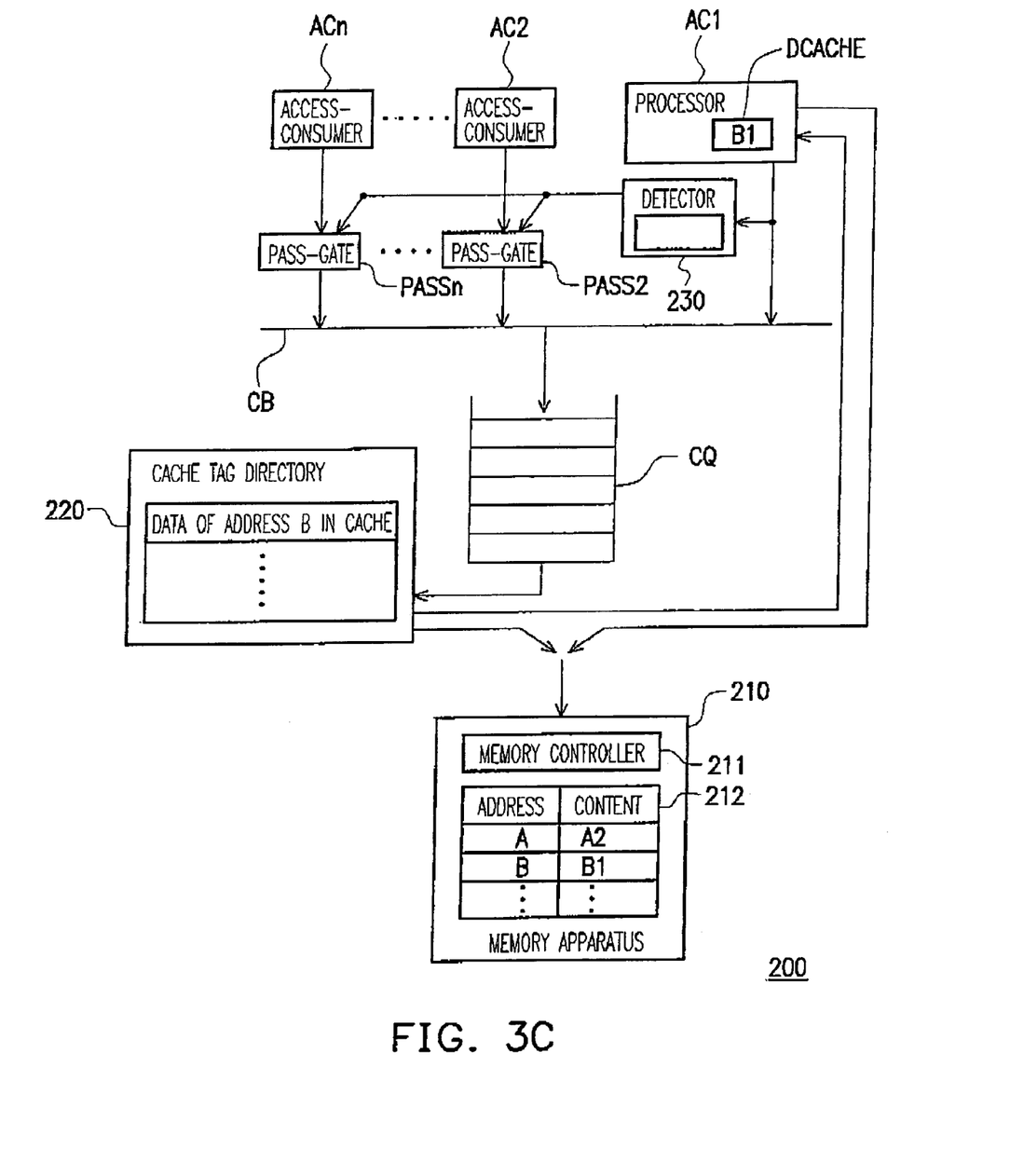

To simplify the description, hereinafter the procedure of sequentially issuing the access requests described above in system 200 is illustrated in FIGS. 3A through 3C. FIGS. 3A through 3C re-draw and illustrate the procedure of the system in FIG. 2 issuing access requests sequentially. Referring to FIG. 3A, data A0 in address A of cache DCACHE is modified into new data A1 after processor AC1 copies the data A0 in address A of the memory apparatus 210 to cache DCACHE by issuing an address A miss write request to the memory apparatus 210. During the course of processor AC1 issuing address A miss write request to the memory apparatus 210, simultaneously the cache tag directory 220 records the address A data which is stored in cache DCACHE.

Here it's supposed that address A and address B have the same tag in cache DCACHE, or it's supposed that address A and address B have the same address characteristic (illustrated as "Addr(A)" in the figure). When processor AC1 replaces data A1 of address A in the cache with data B1 of address B read from the memory apparatus 210, processor AC1 issues the request to read data B1 from address B first followed by the request to write-back data A1 to address A. FIG. 3A illustrates the system status that processor AC1 issues the read data B1 request but yet to issue write-back data A1 request. The read data B1 request issued by Processor AC1 (illustrated as "CPU_rd_B" in the figure) will be registered in the command queue register CQ. Detector 230 will also detect the request "CPU_rd_B" issued by processor AC1 to provide a detecting signal. In the present embodiment, the detecting signal provided by the detector 230 may be address characteristic Addr (A). Here the pass-gates PASS2~PASSn decide whether to pass the access requests issued by the coupled access-consumers AC2~ACn and transmit them according to address characteristic Addr(A) provided by the detector 230.

For example, after processor AC1 issues the request "CPU_rd_B" and before it issues the write-back address A request, access-consumer AC2 happens to issue a write data A2 to address A request (illustrated as "IO_wr_A2" in the figure). The pass-gate PASS2 receives the request "IO_wr_A2" issued by the access-consumer AC2 and the address characteristic Addr (A) provided by the detector 230 and compares them. Since in the request "IO_wr_A2", its access address has also the address characteristic Addr(A), thereby the pass-gate PASS2 pauses transmitting the request "IO_wr_A2". The other pass-gates PASS3~PASSn pass the received request and transmit it to the command bus CB respectively because the results of the comparison are different.

Referring to FIG. 3B, after processor AC1 issues the request "CPU_rd_B", when processor AC1 continues to issue the request to write-back data A1 into address A (illustrated as "CPU_wr_A1" in the figure), request "CPU_wr_A1" will be registered in the command queue register CQ. Here the detector 230 detects the request "CPU_wr_A1" and cancels the provided detecting signal; in the present embodiment, the address characteristic Addr(A) registered in the detector 230 is erased, therefore the detector 230 stops outputting address characteristic Addr(A). The pass-gates PASS2~PASSn have no comparable objects to make the comparison results different, thereby the pass-gates PASS2~PASSn pass the received requests and transmit them to the command bus CB respectively. For example, the pass-gate PASS2 transmits the "IO_wr_A2" request issued by access-consumer AC2 to the command queue register CQ through the command bus CB.

FIG. 3C illustrates how system 200 in FIG. 3B completes requests "CPU_rd_B", "CPU_wr_A1" and "IO_wr_A2". Referring to FIG. 3C, the latest data stored in address A of the memory apparatus 210 is A2, therefore the present invention supports cache coherence.

The address characteristic Addr(A) described above can be replaced by a pause signal by those skilled in the art. In other words, when the processor issues a read second data request to replace the first data in the cache with the second data read from the memory apparatus, the detector provides a pause signal as detecting signal; and when the processor issues the write-back first data request, the detector cancels the provided pause signal. When all the pass-gates receive the pause signal, they respectively pause passing the access requests outputting from the corresponding access-consumers and transmit them; whereas, if there is no pause signal, then pass the access requests outputting from the corresponding access-consumers and transmit them.

Figure 4:
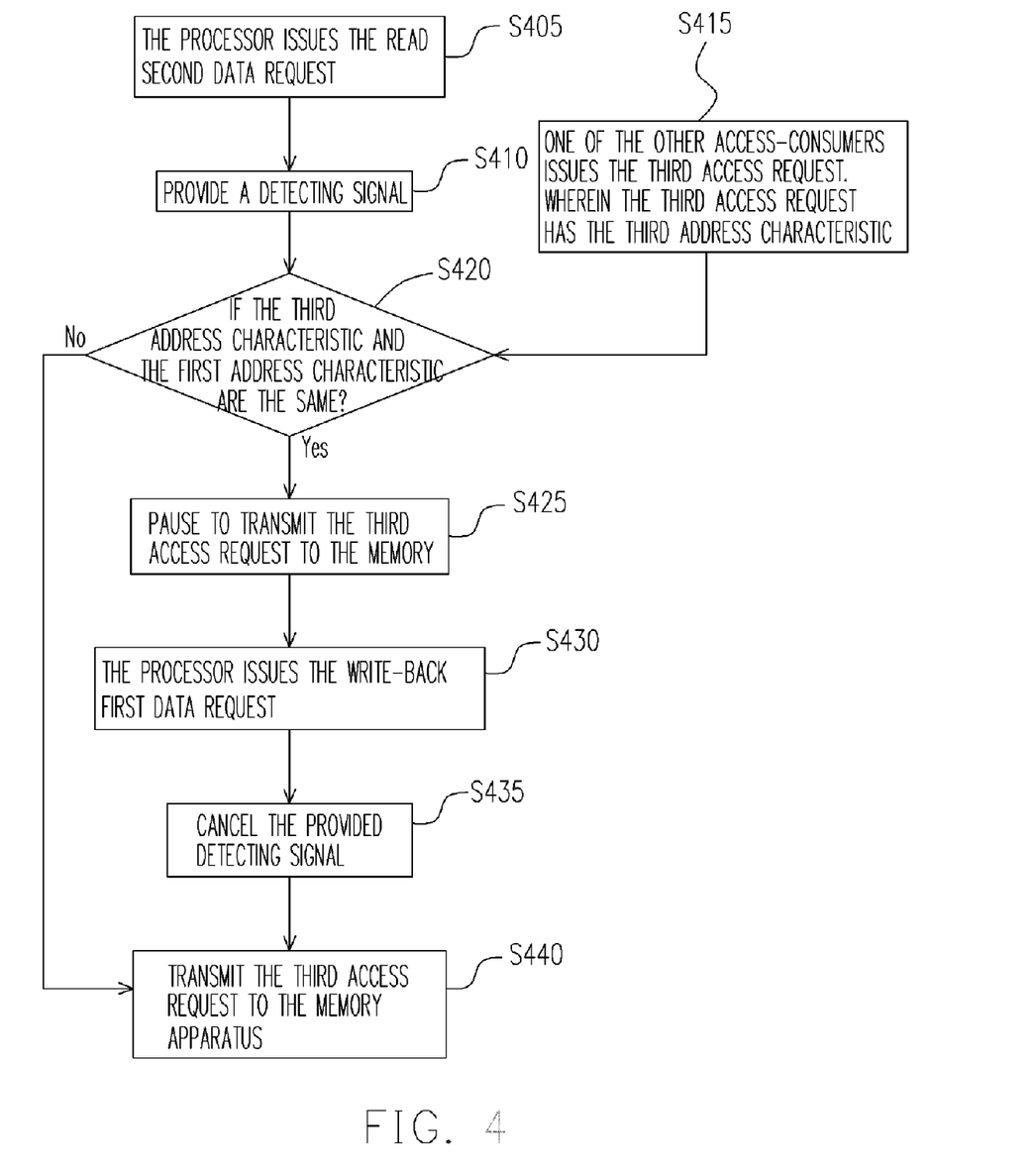
FIG. 4 is a flowchart illustrating a method of cache coherence according to an exemplary embodiment of the present invention.

FIG. 4 is a flowchart illustrating a method of cache coherence according to an exemplary embodiment of the present invention. Referring to FIG. 4, it is applicable to the system with a memory apparatus and a plurality of access-consumers, such as a non-broadcasting multiprocessor system. At least one of the access-consumers is a processor having a cache, which is used to store part of the data of the memory apparatus. The other access-consumers may be other processors and peripherals.

When the processor replaces the first data in the cache with the second data read from the memory apparatus, the processor issues the read second data request (step S405) first and followed by the write-back first data request (step S430). When the processor issues the read second data request, it provides a detecting signal (step S410). When the processor issues the write-back first data request, it cancels the provided detecting signal (step S435). It is decided whether to transmit the third access request outputting from each access-consumer to the memory apparatus according to the detecting signal.

For example, if the addresses of the first data and the second data in the memory apparatus have the same first address characteristic, then in step S410, it provides the first address characteristic as the detecting signal when the processor issues the read second data request. In addition, in step S435, it cancels the provided first address characteristic when the processor issues the write-back first data request.

In step S415, one of the other access-consumers issues the third access request. Wherein, the third address to be accessed by the third access request has the third address characteristic. Then step S420 proceeds to compare the third address characteristic with the first address characteristic. Transmit the third access request to the memory apparatus (step S440) directly if the third address characteristic and the first address characteristic are different. By contrast, pause transmitting the third access request to the memory apparatus (step S425) until steps S430 and S435 are completed; then continue to transmit the third access request to the memory apparatus (step S440) if the third address characteristic is identical with the first address characteristic.

The pause signal can also be used as detecting signal by those skilled in the art; as in step S420, it's changed into determining whether there is a pause signal (here the step S415 is skipped). In other words, when the processor issues the read second data request (step S405), the pause signal is provided as the detecting signal (step S410). If the pause signal is obtained, then pause transmitting the third access request to the memory apparatus (step S425); the third access request is not transmitted to the memory apparatus (step S440) until the processor issues the write-back first data request (step S430) and then cancel the provided pause signal (step S435). Whereas, transmit the third access request directly to the memory apparatus (step S440) if there is no pause signal.

Figure 5:
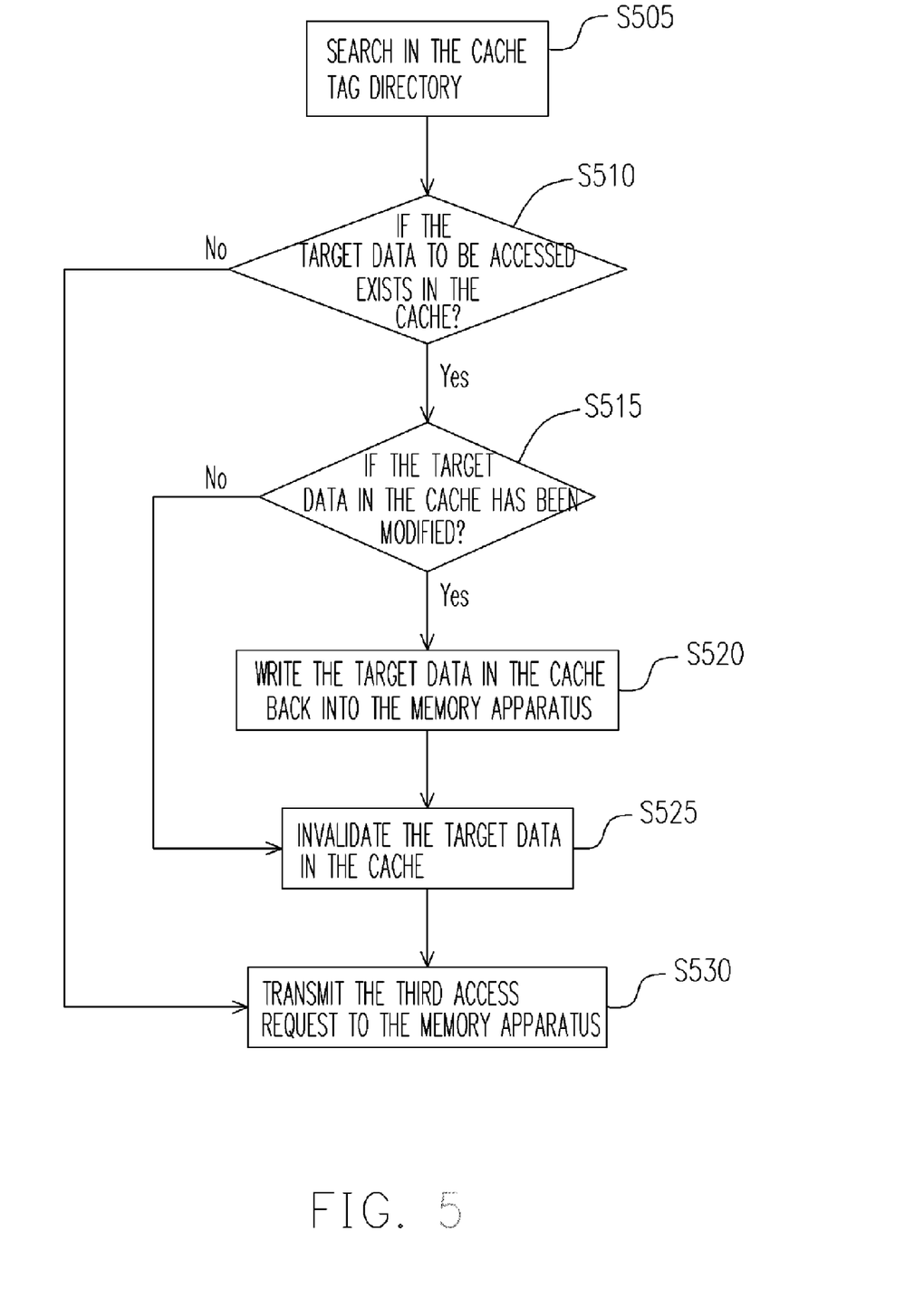
FIG. 5 is a flowchart illustrating an embodiment example of step S440 in FIG. 4.

The step S440 described above can be embodied referring to FIG. 5. Referring to FIG. 5, in step S505, searching in the cache tag directory, and in step S510, determining whether the target data of the third address to be accessed by the third access request exists in the cache. If the target data doesn't exist in the cache, it proceeds to step S530 directly. In other words, the third access request is transmitted to the memory apparatus. If the target data exists in the cache, then transmit the third access request to the memory apparatus after the target data in the cache is invalidated.

The procedure of invalidating the target data in the cache described above includes the following steps. First, it is decided whether the target data in the cache has been modified (step S515). If the target data in the cache has been modified, then invalidate the target data after writing the target data back into the memory apparatus (step S520); otherwise, invalidate the target data directly (step S525).

In the present embodiment, the content of the cache tag directory can be identical with the content of the tag memory in the cache, or, the content of the cache tag directory can be memory-mapped to the memory apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cache coherence system comprising:
   a memory apparatus which is to provide data access function;
   a plurality of access-consumers, at least one of the plurality of access-consumers is a processor having a cache, wherein the cache stores part of data of the memory apparatus, and, the processor issues a read second data request first followed by a write-back first data request and registers the read second data request and the write-back first data request in a command queue register when the processor replaces a first data in the cache with a second data read from the memory apparatus;
   a detector coupled to the processor, which is used to provide a detecting signal after the processor issues the read second data request, and to cancel the provided detecting signal when the processor issues the write-back first data request; and
   a plurality of pass-gates, each of the plurality of pass-gates is coupled between a corresponding access-consumer and the memory apparatus, and is used to decide whether to pass a third access request outputting from the corresponding access-consumer to the memory apparatus according to the detecting signal provided by the detector,
   wherein the addresses of the first data and the second data in the memory apparatus have a same first address characteristic when both the first data and the second data are in the memory apparatus;
   when the processor issues the read second data request, the detector registers and provides the first address characteristic as the detecting signal; and
   when the processor issues the write-back first data request, the detector erases the registered first address characteristic, so that cancels the provided detecting signal, wherein the number of bits of the first address characteristic is determined by the rate of the processor and the size of one cache line in the cache.

2. The cache coherence system as claimed in claim 1, wherein each of the plurality of pass-gates receives the third access request outputting from the corresponding access-consumer for accessing a third address and the first address characteristic provided by the detector, and compares a third address characteristic of the third address with the first address characteristic after the processor issues the read second data request and before the processor issues the write-back first data request,
   if the third address characteristic and the first address characteristic are identical, then it pauses passing the third access request; and
   if the third address characteristic and the first address characteristic are different, then it passes the third access request;
   wherein the number of bits of the third address characteristic is determined by the rate of the processor and the size of one cache line in the cache.

3. The cache coherence system as claimed in claim 1, wherein the detector provides a pause signal as the detecting signal when the processor issues the read second data request, and the detector cancels the provided pause signal when the processor issues the write-back first data request.

4. The cache coherence system as claimed in claim 3, wherein each of the plurality of pass-gates receives the third access request outputting from the corresponding access-consumer to access a third address and the pause signal provided by the detector,
   if the pause signal is obtained, the pass-gate pauses the passing of the third access request to the memory apparatus; and
   if there is no pause signal, the pass-gate passes the third access request to the memory apparatus.

5. The cache coherence system as claimed in claim 1 further includes:
   a cache tag directory, coupled between the plurality of pass-gates and the memory apparatus, to record which data in the memory apparatus has been stored in the cache, and when one of the access-consumers issues the third access request through the corresponding passgate, the cache tag directory checks whether a target data of a third address to be accessed by the third access request exists in the cache, wherein if the data of the third address exists in the cache, then transmit the third access request to the memory apparatus after the target data in the cache is invalidated; and if the data of the third address doesn't exist in the cache, then transmit the third access request to the memory apparatus directly.

6. The cache coherence system as claimed in claim 5, wherein the content of the cache tag directory is identical to the content of a tag memory in the cache.

7. The cache coherence system as claimed in claim 5, wherein when the cache tag directory invalidates the target data in the cache to be accessed, if the target data in the cache has been modified, the cache invalidates the target data after it writes the target data back to the memory apparatus.

8. The cache coherence system as claimed in claim 5, wherein the command queue register is coupled between the plurality of pass-gates and the cache tag directory.

9. The cache coherence system as claimed in claim 1, wherein the plurality of access-consumers are processors and peripherals.

10. A cache coherence method, which is applicable to systems with a memory apparatus and a plurality of access-consumers, wherein at least one of the plurality of access-consumers is a processor having a cache, and the cache is used to store part of data of the memory apparatus, the method includes:

the processor issues a read second data request first followed by a write-back first data request and registers the read second data request and the write-back first data request in a command queue register when the processor replaces a first data in the cache with a second data read from the memory apparatus, wherein the addresses of the first data and the second data in the memory apparatus have a same first address characteristic when both the first data and the second data are in the memory apparatus;

providing the first address characteristic as a detecting signal from the processor when the processor issues the read second data request;

cancel the first address characteristic by the processor when the processor issues the write-back first data request; and decides whether to transmit a third access request outputting from each of the access-consumers to the memory apparatus according to the detecting signal, wherein the number of bits of the first and the third address characteristics is determined by the rate of the processor and the size of one cache line in the cache.

11. The cache coherence method as claimed in claim 10, the method further includes:

compare a third address characteristic of a third address in the third access request with the first address characteristic;

transmits the third access request to the memory apparatus if the third address characteristic and the first address characteristic are different; and pauses transmitting the third access request to the memory apparatus if the third address characteristic and the first address characteristic are identical.

12. The cache coherence method as claimed in claim 10 further includes:

providing a pause signal as the detecting signal when the processor issues the read second data request;

cancels the provided pause signal when the processor issues the write-back first data request;

pauses transmitting the third access request to the memory apparatus if the pause signal is obtained; and transmitting the third access request to the memory apparatus if there is no pause signal.

13. The cache coherence method as claimed in claim 10 further includes:

checks in a cache tag directory whether a target data of a third address in the memory apparatus to be accessed by the third access request exists in the cache;

if the target data exists in the cache, transmits the third access request to the memory apparatus after the target data in the cache is invalidated; and if the target data doesn't exist in the cache, transmits the third access request to the memory apparatus directly.

14. The cache coherence method as claimed in claim 13, wherein the content of the cache tag directory is identical to the content of a tag memory in the cache.

15. The cache coherence method as claimed in claim 13, wherein the content of the cache tag directory is memory-mapped to the memory apparatus.

16. The cache coherence method as claimed in claim 10, wherein the plurality of access-consumers are processors and peripherals.

* * * * *